United States Patent
Chae et al.

(10) Patent No.: US 10,506,417 B2
(45) Date of Patent: Dec. 10, 2019

(54) METHOD AND APPARATUS FOR TRANSMITTING/RECEIVING SIGNAL OF DEVICE-TO-DEVICE COMMUNICATION TERMINAL IN WIRELESS COMMUNICATION SYSTEM

(71) Applicant: LG Electronics Inc., Seoul (KR)

(72) Inventors: Hyukjin Chae, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 1 day.

(21) Appl. No.: 15/544,663

(22) PCT Filed: Jan. 25, 2016

(86) PCT No.: PCT/KR2016/000779
§ 371 (c)(1),
(2) Date: Jul. 19, 2017

(87) PCT Pub. No.: WO2016/117983
PCT Pub. Date: Jul. 28, 2016

(65) Prior Publication Data
US 2017/0374539 A1 Dec. 28, 2017

Related U.S. Application Data

(60) Provisional application No. 62/106,741, filed on Jan. 23, 2015, provisional application No. 62/106,740, filed on Jan. 23, 2015.

(51) Int. Cl.
| | |
|---|---|
| *H04W 8/00* | (2009.01) |
| *H04B 7/26* | (2006.01) |
| *H04L 5/00* | (2006.01) |
| *H04L 29/08* | (2006.01) |
| *H04W 72/04* | (2009.01) |

(Continued)

(52) U.S. Cl.
CPC .............. *H04W 8/005* (2013.01); *H04B 7/26* (2013.01); *H04L 5/00* (2013.01); *H04L 29/08* (2013.01);
(Continued)

(58) Field of Classification Search
CPC ....... H04W 8/00; H04W 8/005; H04W 72/04; H04L 69/324; H04L 29/08
(Continued)

(56) References Cited

U.S. PATENT DOCUMENTS 7,961,680 B2   6/2011  Park et al.
8,489,951 B2   7/2013  Peisa et al.
(Continued)

OTHER PUBLICATIONS

Change Request: Ericsson, "Introduction of ProSe," 3GPP TSG-RAN WG2 Meeting #88, Nov. 17-21, 2014, R2-145435, XP050920859.
(Continued)

*Primary Examiner* — Jae Y Lee
*Assistant Examiner* — Jean F Voltaire
(74) *Attorney, Agent, or Firm* — Dentons US LLP

(57) ABSTRACT

An embodiment of the present invention is a device-to-device (D2D) signal receiving method in which a terminal receives a D2D signal in a wireless communication system. The method includes the steps of: receiving a first medium access control protocol data unit (MAC PDU); receiving a second MAC PDU; and determining whether to combine the first MAC PDU and the second MAC PDU in order to decode; wherein whether to combine the first MAC PDU and the second MAC PDU in order to decode is determined from the number of transmissions of MAC PDUs and an NDI that have been instructed to the terminal.

9 Claims, 11 Drawing Sheets

(51) Int. Cl.
  *H04W 92/18* (2009.01)
  *H04W 76/14* (2018.01)
  *H04L 1/18* (2006.01)
  *H04L 1/08* (2006.01)

(52) U.S. Cl.
  CPC ........... *H04L 69/324* (2013.01); *H04W 72/04* (2013.01); *H04W 76/14* (2018.02); *H04W 92/18* (2013.01); *H04L 1/08* (2013.01); *H04L 1/1812* (2013.01); *H04L 1/1829* (2013.01)

(58) Field of Classification Search
  USPC .................................................. 370/329–332
  See application file for complete search history.

(56) References Cited

U.S. PATENT DOCUMENTS

| | | | | |
|---|---|---|---|---|
| 2008/0267190 | A1* | 10/2008 | Baker | H04L 1/0083 370/394 |
| 2010/0246491 | A1* | 9/2010 | Bae | H04L 1/1845 370/328 |
| 2012/0057560 | A1* | 3/2012 | Park | H04L 1/08 370/329 |
| 2013/0322413 | A1 | 12/2013 | Pelletier et al. | |
| 2014/0321293 | A1 | 10/2014 | Hwang | |
| 2015/0009910 | A1 | 1/2015 | Ryu et al. | |
| 2016/0128082 | A1* | 5/2016 | Chen | H04W 72/10 370/329 |
| 2016/0128115 | A1* | 5/2016 | Panteleev | H04W 72/121 370/329 |
| 2017/0230149 | A1* | 8/2017 | Wang | H04L 1/0057 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 12)," 3GPP TS 36.321 V12.3.0 (Sep. 2014), F-06921, XP050925625.

* cited by examiner

FIG. 5
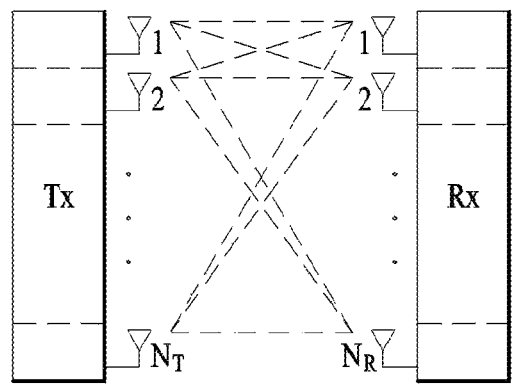
(a)
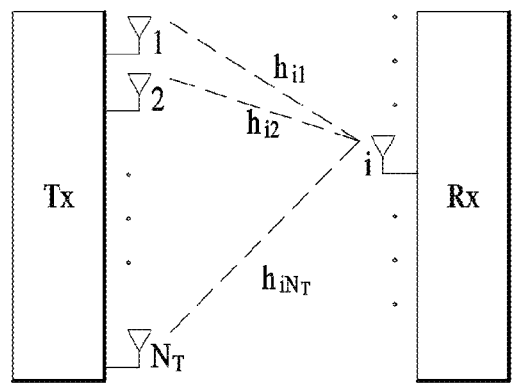
(b)

FIG. 8
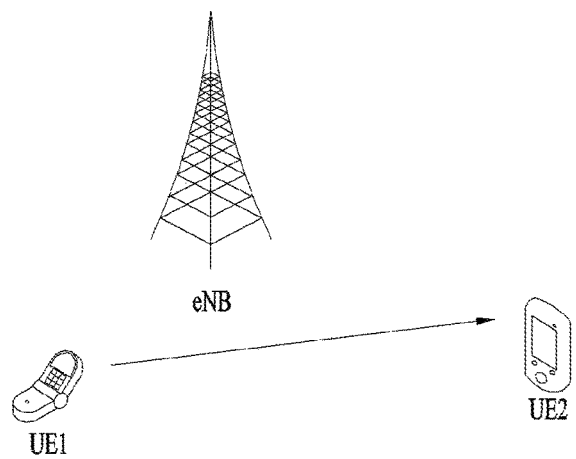
(a)
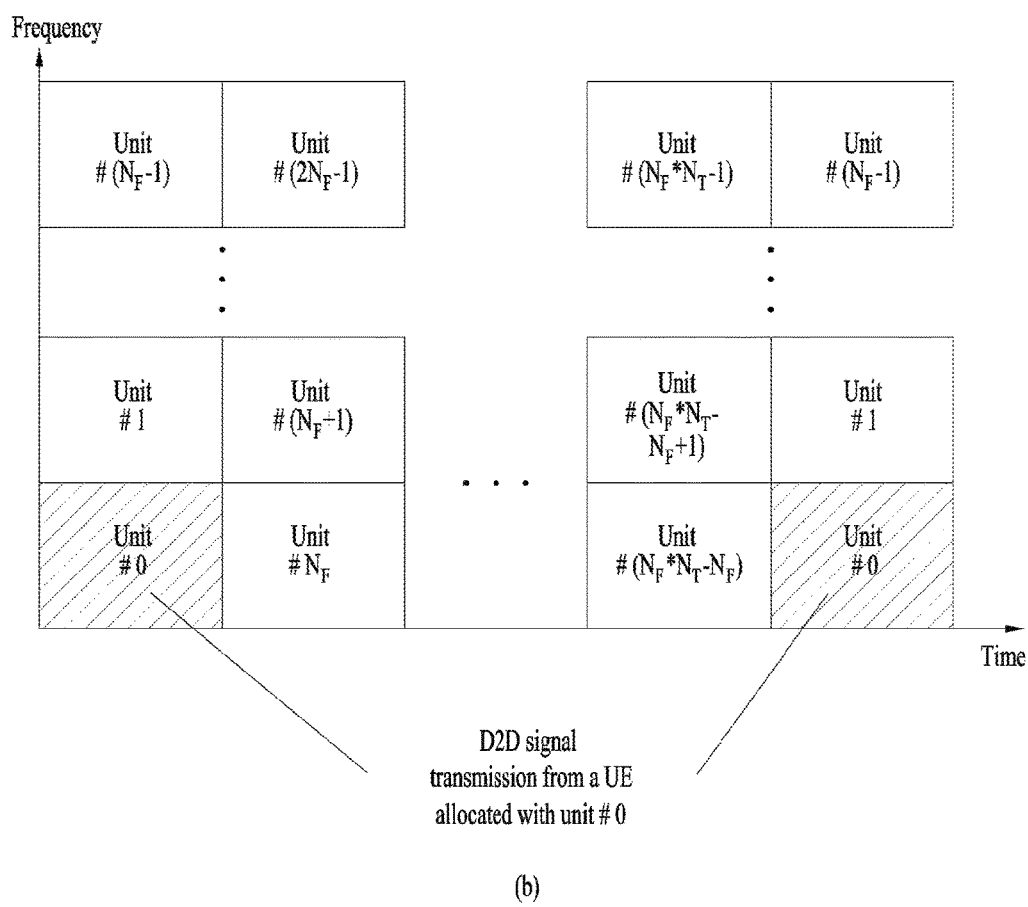
(b)

METHOD AND APPARATUS FOR TRANSMITTING/RECEIVING SIGNAL OF DEVICE-TO-DEVICE COMMUNICATION TERMINAL IN WIRELESS COMMUNICATION SYSTEM

This application is a 35 USC § 371 National Stage entry of International Application No. PCT/KR2016/000779 filed on Jan. 25, 2016, and claims priority to U.S. Provisional Application Nos. 62/106,740 filed on Jan. 23, 2015 and 62/106,741 filed on Jan. 23, 2015, all of which are hereby incorporated by reference in their entireties as if fully set forth herein.

TECHNICAL FIELD

Following description relates to a wireless communication system, and more particularly, to a method of transmitting and receiving a signal and an apparatus therefor when MAC PDU (medium access control protocol data unit) transmission count is changed in D2D communication.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Device-to-Device (D2D) communication means a communication system for directly exchanging audio, data and the like between user equipments without passing through a base station (evolved NodeB: eNB) by establishing a direct link between the user equipments. D2D communication may include such a system as a UE-to-UE (user equipment-to-user equipment) communication, Peer-to-Peer communication and the like. And, the D2D communication system may be applicable to M2M (Machine-to-Machine) communication, MTC (Machine Type Communication) and the like.

D2D communication is currently considered as one of schemes for setting a load put on a base station due to the rapidly increasing data traffic. For instance, according to D2D communication, unlike an existing wireless communication system, since data is exchanged between devices without passing through a base station, overload of a network can be reduced. Moreover, by introducing D2D communication, it is able to expect effects such as procedure reduction of a base station, power consumption reduction of devices involved in D2D, data transmission speed increase, reception capability increase of a network, load distribution, extension of cell coverage and the like.

DISCLOSURE OF THE INVENTION

Technical Task

When MAC PDU (medium access control protocol data unit) transmission count is changed in D2D communication, a technical task of the present invention is to provide a method of indicating the transmission count to a UE, an operation of the UE, which have received the transmission count, and the like.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of receiving a D2D (device-to-device) signal, which is received by a user equipment (UE) in a wireless communication system, includes the steps of receiving a first MAC PDU (medium access control protocol data unit), receiving a second MAC PDU, and determining whether to perform decoding by combining the first MAC PDU and the second MAC PDU. In this case, whether to perform decoding by combining the first MAC PDU and the second MAC PDU can be determined based on MAC PDU transmission count indicated to the UE and an NDI.

To further achieve these and other advantages and in accordance with the purpose of the present invention, according to a different embodiment, a D2D (device-to-device) user equipment in a wireless communication system includes a transmitter and a receiver, and a processor, the processor configured to receive a first MAC PDU and a second MAC PDU, the processor configured to determine whether to perform decoding by combining the first MAC PDU and the second MAC PDU. In this case, whether to perform decoding by combining the first MAC PDU and the second MAC PDU can be determined based on MAC PDU transmission count indicated to the UE and an NDI.

When the NDI of the first MAC PDU corresponds to 1, the NDI of the second MAC PDU corresponds to 0, and the MAC PDU transmission count is equal to or greater than the total number of MAC PDUs, which are received until the second MAC PDU is received after an MAC PDU with NDI=1 is received, if the MAC PDU transmission count is greater than 2, the UE can perform decoding by combining the first MAC PDU and the second MAC PDU.

If both the NDI of the first MAC PDU and the NDI of the second MAC PDU correspond to 0 and the MAC PDU transmission count is greater than the total number of MAC PDUs, which are received until the second MAC PDU is received after an MAC PDU with NDI=1 is received, the UE can perform decoding by combining the first MAC PDU and the second MAC PDU.

If the NDI of the first MAC PDU corresponds to 0 and the NDI of the second MAC PDU corresponds to 1, the UE may not combine the first MAC PDU and the second MAC PDU when decoding is performed.

The NDI may have a different value according to an OCC (orthogonal cover code).

The MAC PDU transmission count can be transmitted in a manner of being multiplexed with MAC PDU in an RB (resource block) in which the MAC PDU is transmitted.

If the first MAC PDU corresponds to an MAC PDU of which a first NDI corresponds to 1 in a PSCCH transmission period, the MAC PDU transmission count can be indicated in the PSSCH.

If the first MAC PDU corresponds to an MAC PDU of which a second or later NDI corresponds to 1 in the PSCCH transmission period, the MAC PDU transmission count can be indicated in an MAC PDU appearing prior to the first MAC PDU.

If the first MAC PDU corresponds to an MAC PDU of which a first NDI corresponds to 1 in a PSCCH transmission period, the MAC PDU transmission count may correspond to a value allocated to a resource pool in advance.

If the first MAC PDU corresponds to an MAC PDU of which a second or later NDI corresponds to 1 in the PSCCH transmission period, the MAC PDU transmission count can be indicated in an MAC PDU appearing prior to the first MAC PDU.

The MAC PDU transmission count may correspond to a multiple of 4.

Advantageous Effects

According to the present invention, it is able to variably and efficiently manage MAC PDU transmission count in D2D communication.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for a configuration of a wireless communication system having multiple antennas;

FIG. 8 is a diagram for an example of a D2D resource pool for performing D2D communication;

BEST MODE

Mode for Invention

Figure 1:
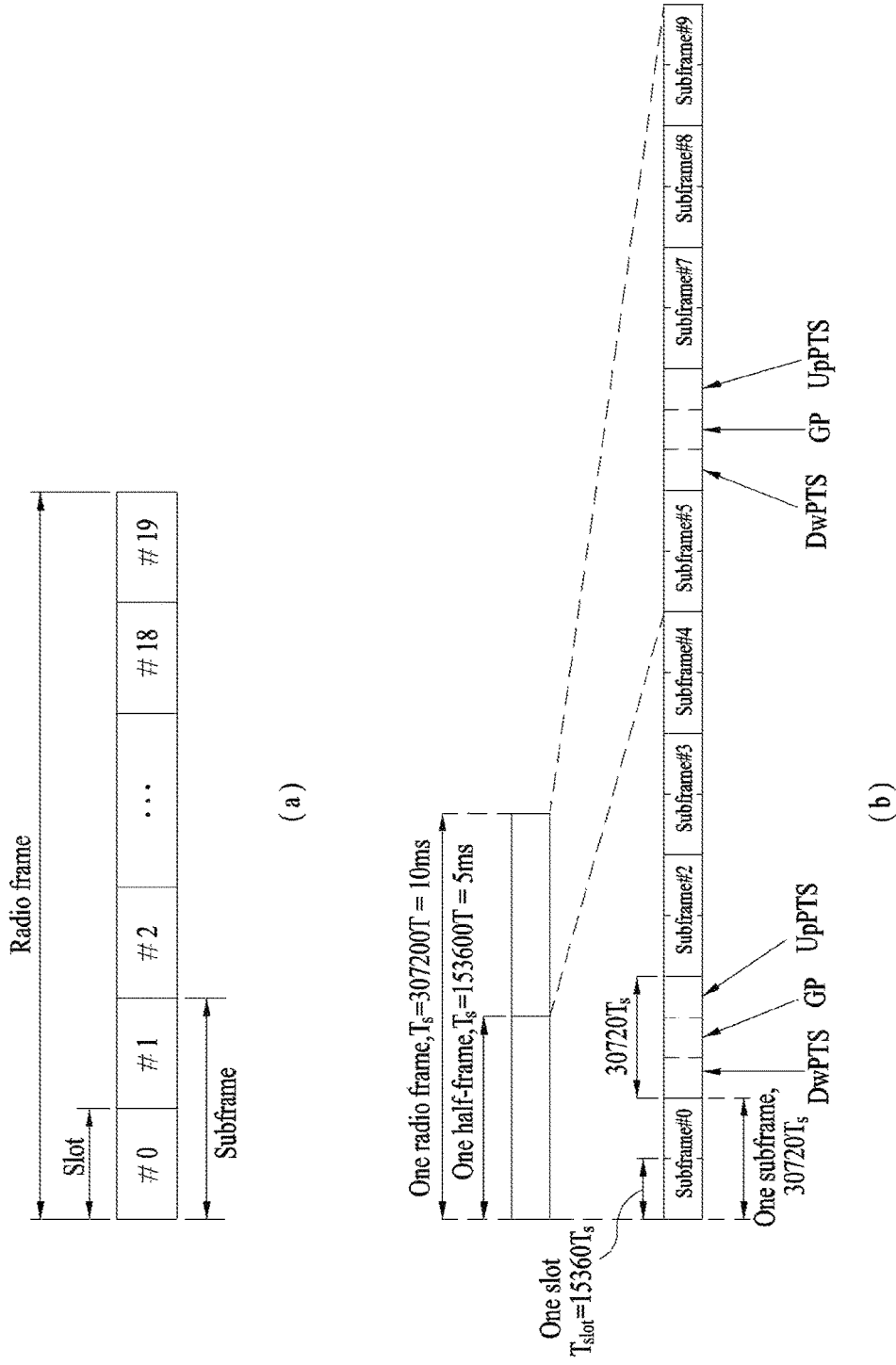
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless Packet communication system, uplink and/or downlink data Packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
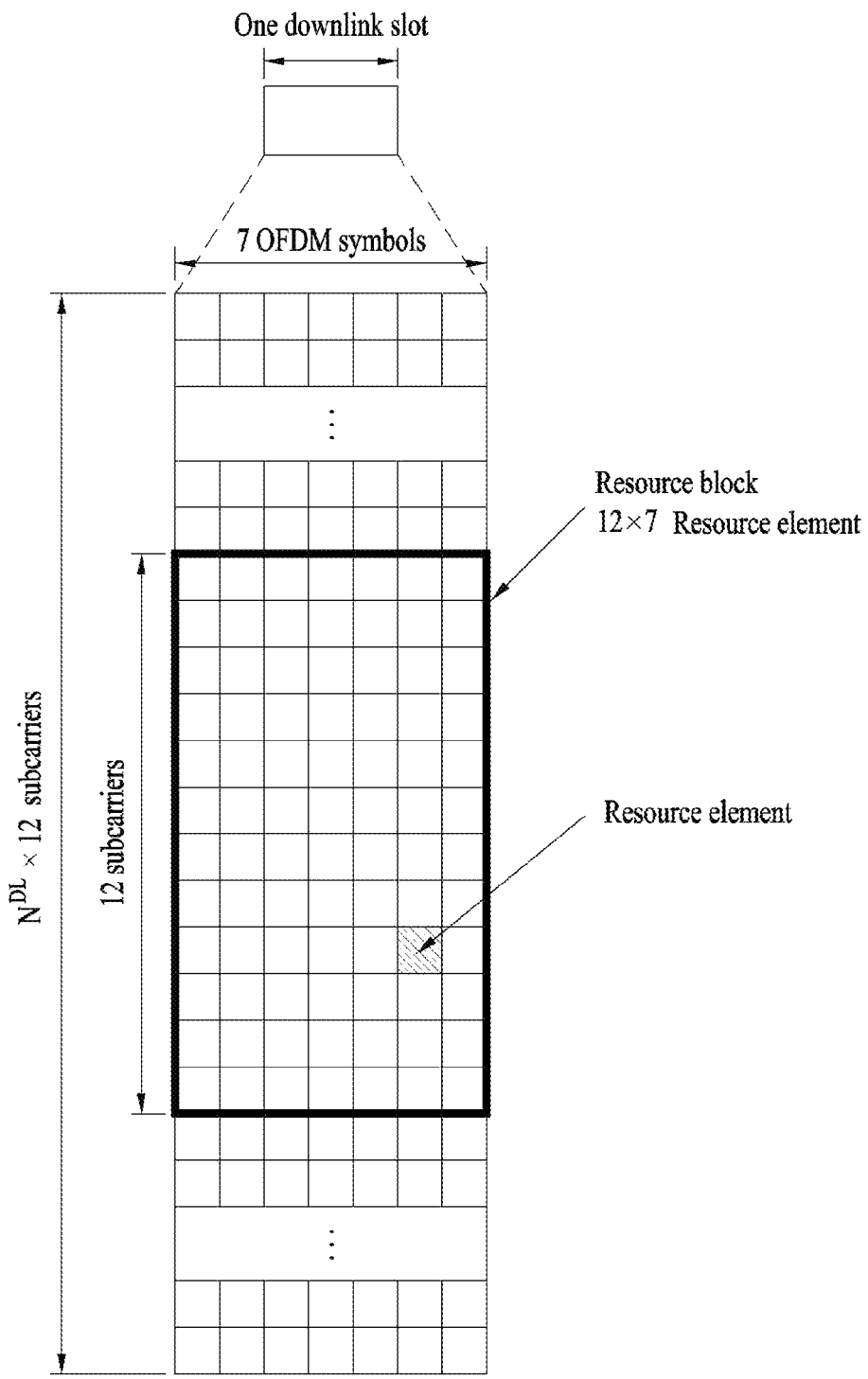
FIG. 2 is a diagram for a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
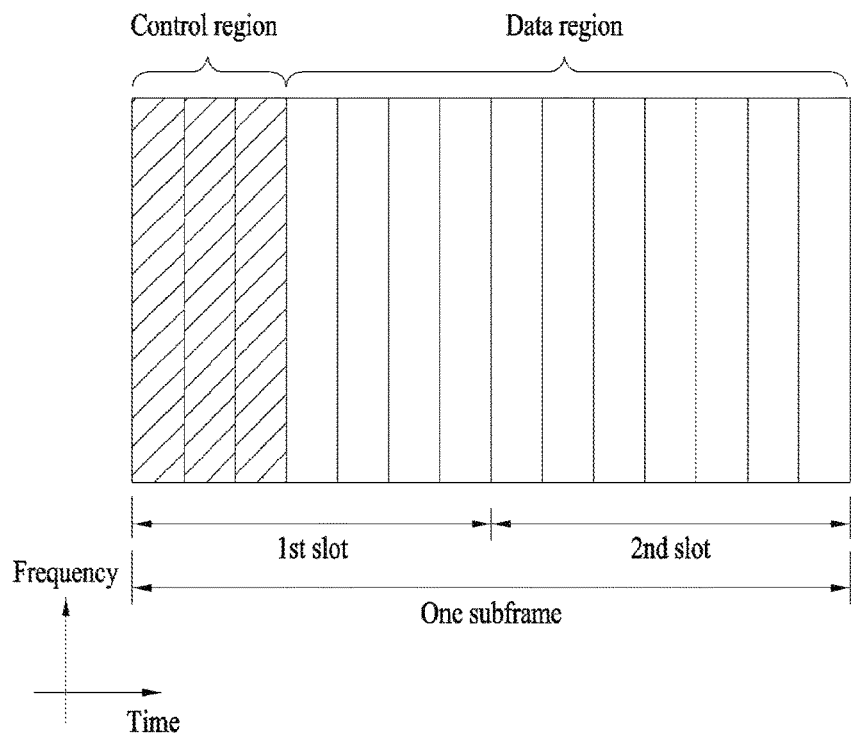
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
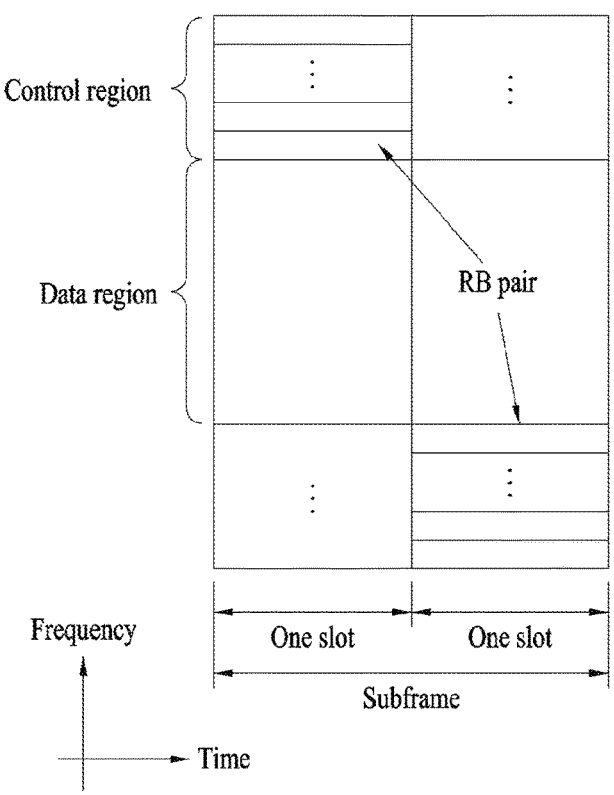
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a Packet is transmitted on a radio channel. In view of the nature of the radio channel, the Packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $w_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}] \quad \text{[Equation 7]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the NR receive antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & \ddots & \vdots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

Figure 6:
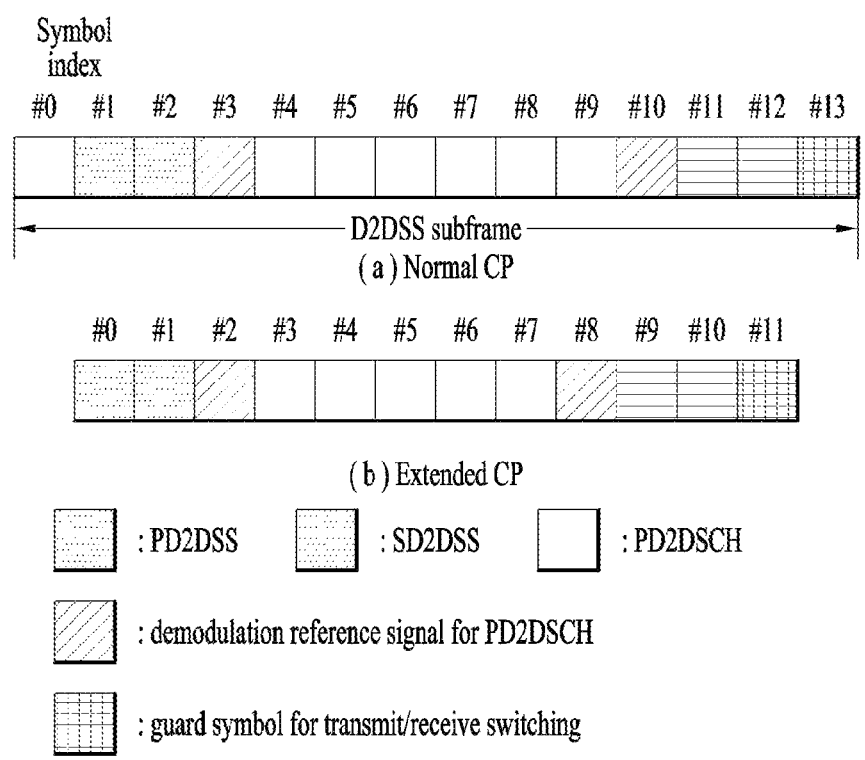
FIG. 6 is a diagram for a subframe in which a D2D synchronization signal is transmitted.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS). Unlike a DL PSS, the PD2DSS may use a different Zadoff-chu root index (e.g., 26, 37). And, the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
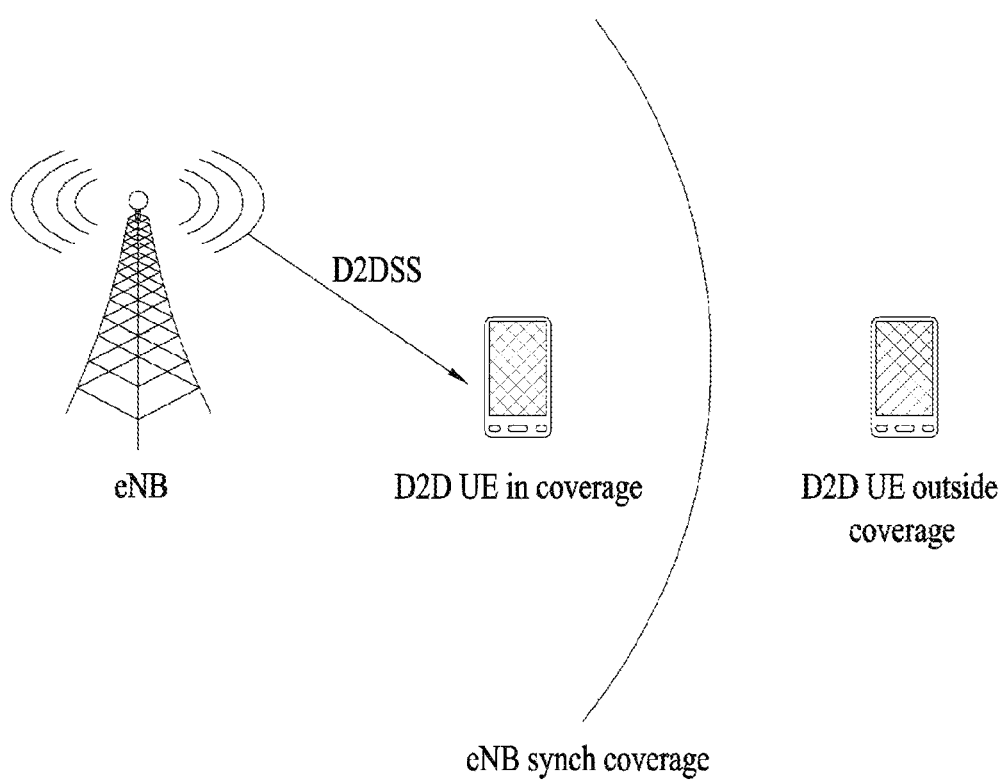
FIG. 7 is a diagram for explaining relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE.

D2D Resource Pool

FIG. 8 shows an example of a UE1, a UE2 and a resource pool used by the UE1 and the UE2 performing D2D communication. In FIG. 8 (*a*), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8 (*b*) shows an example of configuring a resource unit. Referring to FIG. 8 (*b*), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include SA (scheduling assignment), a D2D data channel, and a discovery channel. The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a PSCCH (physical sidelink control channel). The D2D data channel (or, PSSCH (physical sidelink shared channel)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool. The discovery channel may correspond to a resource pool for a message that enables a neighboring UE to discover transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

Transmission and Reception of SA

A mode 1 UE can transmit an SA signal (or, a D2D control signal, SCI (sidelink control information)) via a resource configured by an eNB. A mode 2 UE receives a configured resource to be used for D2D transmission. The mode 2 UE can transmit SA by selecting a time frequency resource from the configured resource.

Figure 9:
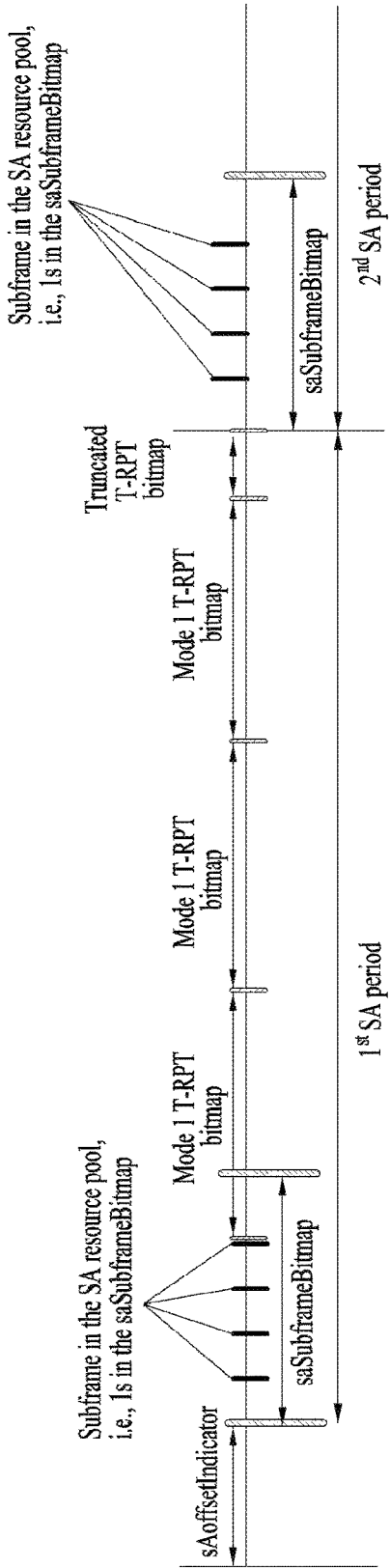
FIG. 9 is a diagram for explaining an SA period.

The SA period can be defined as FIG. 9. Referring to FIG. 9, a first SA period can start at a subframe apart from a specific system frame as much as a prescribed offset (SAOffsetIndicator) indicated by higher layer signaling. Each SA period can include an SA resource pool and a subframe pool for transmitting D2D data. The SA resource pool can include subframes ranging from a first subframe of an SA period to the last subframe among subframes indicated by a subframe bitmap (saSubframeBitmap) to transmit SA. In case of mode 1, T-RPT (time-resource pattern for transmission) is applied to the resource pool for transmitting D2D data to determine a subframe in which an actual data is transmitted. As shown in the drawing, if the number of subframes included in an SA period except the SA resource pool is greater than the number of T-RPT bits, the T-RPT can be repeatedly applied and the lastly applied T-RPT can be applied in a manner of being truncated as many as the number of remaining subframes.

Method of Dynamically Indicating MAC PDU Transmission Count in D2D Communication In a legacy LTE system, transmission count of one MAC PDU (the number of repetition of one MAC PDU) is fixed by 4 and a redundancy version of MAC PDU is transmitted by a fixed order such as 0→2→3→1. Besides the aforementioned scheme, the present invention proposes a more dynamic resource allocation scheme that the MAC PDU transmission count (the number of repetition of MAC PDU) varies. When the MAC PDU transmission count varies, it may be able to transmit MAC PDU using various methods described in the following.

When MAC PDU Transmission Count Changes in Unit of PSCCH Period

If the MAC PDU transmission count changes in a unit of a PSCCH period, the MAC PDU transmission count can be indicated by PSCCH.

To this end, it may be able to define a new PSCCH format. In this case, the new PSCCH format is different from a legacy PSCCH format in a type of information and/or a length of the information included in the format. When a physical layer format is different from the legacy PSCCH format, it can be included in the scope of the invention as well. For example, it may be able to define the new PSCCH format by defining X RB (X corresponds to a predetermined value) PSCCH or adding a partial bit field to a legacy 1RB PSCCH format. The new PSCCH format can include transmission count per MAC PDU of a corresponding period or a next period. Or, the new PSCCH format can include all transmission counts per MAC PDU.

As a different example, the PSCCH may use a legacy PDCCH format (0). Specifically, it may be able to indicate transmission count per MAC PDU using an unused state of all or a part of T-RPT, MCS, and a TA field. Or, it may be able to indicate a change of transmission count per MAC PDU by differently configuring a CRC mask of PSCCH according to the transmission count per MAC PDU. For example, if a CRC mask corresponds to X0 when the transmission count per MAC PDU corresponds to 2, the CRC mask is configured by X1 when the transmission count per PDU corresponds to 4. As a further different example, an ID included in PSCCH can be differently configured according to the transmission count per MAC PDU. For example, if an ID corresponds to Y0 when the transmission count per MAC PDU corresponds to 2, the ID is configured by Y1 when the transmission count per PDU corresponds to 4.

When MAC PDU Transmission Count Changes Irrespective of PSCCH Resource Region Period It may use a dynamic change rather than the method of changing the MAC PDU transmission count in the aforementioned PSCCH resource region period unit. To this end, it may use an NDI (new data indicator). For example, if the NDI corresponds to 1, it indicates a new MAC PDU. Hence, a UE can decode MAC PDUs of which the NDI corresponds to 0 by combining the MAC PDUs followed by the MAC PDU of which the NDI corresponds to 1.

Figure 10:
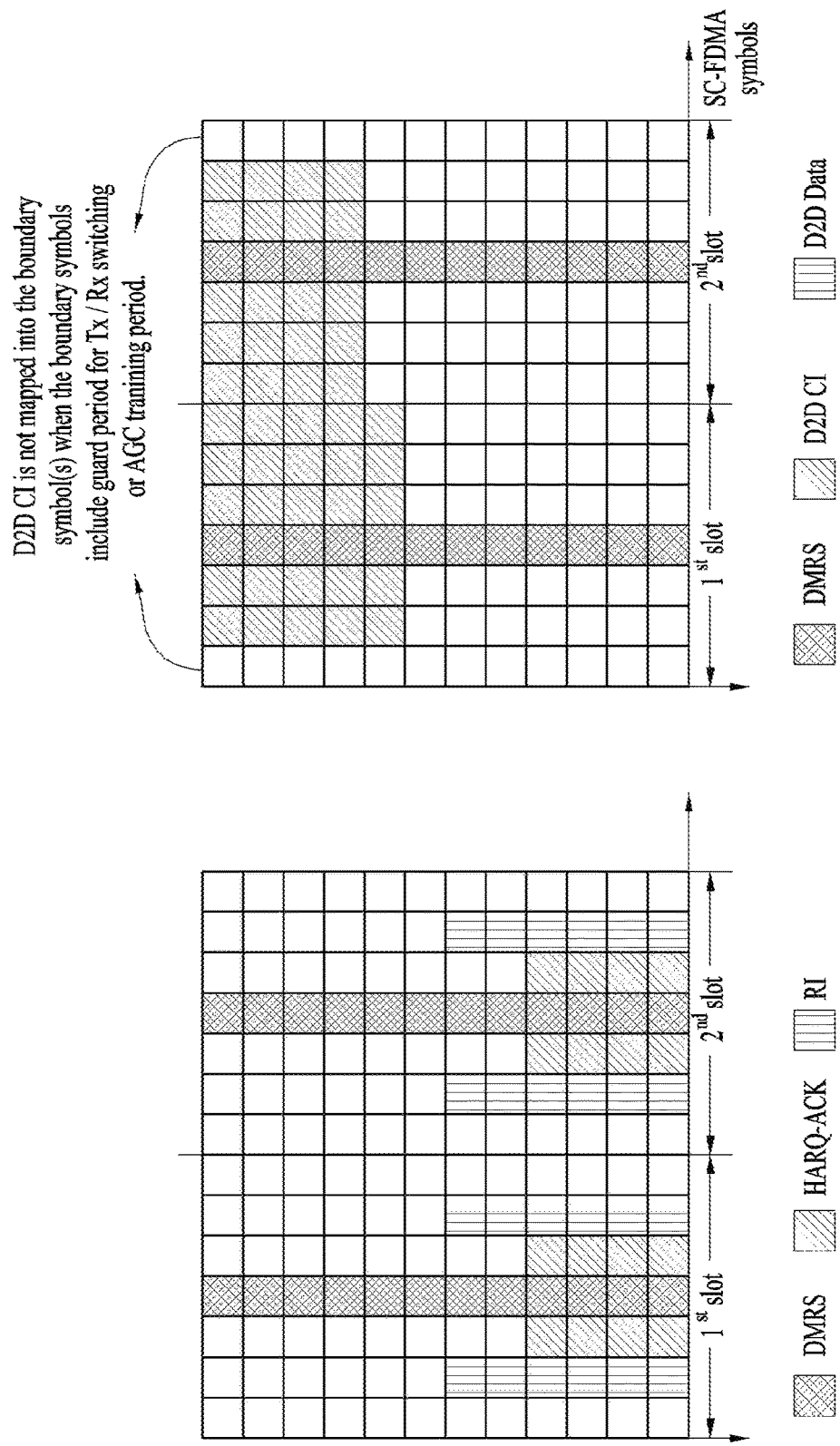
FIGS. 10 to 12 are diagrams for explaining embodiments of the present invention.

In this case, the NDI can be signaled using a UCI piggyback scheme. In this case, as shown in FIG. 10 (a), the UCI piggyback scheme corresponds to a method of using partial REs near a DMRS. Or, as shown in FIG. 10 (b), the UCI piggyback scheme corresponds to a method of transmitting MAC PDU transmission count in a manner of performing time first mapping on a partial RE from a lower subcarrier of the lowest RB. Referring to FIG. 10 (b), the first symbol and the last symbol are not used. This is because since partial samples of the first symbol are able to be used as AGC (automatic gain control) and the last symbol is used for Tx/Rx switching, a UE may fail to properly receive information transmitted from the symbols. In summary, the UCI piggyback scheme of the present invention is to transmit control information (RV, NDI, transmission count, etc.) together with a Packet in a manner of multiplexing the control information with an RB, which is transmitted via an information bit and separate coding. In D2D communication, control information, which is transmitted together with data, is commonly referred to as D2D CI piggyback.

Besides the UCI piggyback scheme, the NDI can be indicated via DMRS cyclic shift (CS). For example, when the NDI corresponds to 0, it may use 0 as the CS. When the NDI corresponds to 1, it may use 6 as the CS.

As a further different method, it may be able to indicate transmission count using MAC PDU itself.

As a first example, it may be able to indicate transmission count of MAC PDU using an OCC of a DMRS of a Packet in which the MAC PDU is transmitted. For example, If NDI corresponds to 0, [1 1] is used as the OCC. If the NDI corresponds to 1, [1 −1] is used as the OCC.

As a second example, it may be able to transmit MAC PDU in a manner of including a bit indicating transmission count per MAC PDU in the MAC PDU using the aforementioned UCI piggyback scheme. In this case, in order to indicate an order of the currently transmitted Packet among the transmission count of the MAC PDU, it may also be able to transmit an RV (or information indicating an order of current transmission) of the currently transmitted Packet.

As a third example, it may be able to signal transmission count of a MAC PDU, which is firstly transmitted after PSCCH, in PSCCH and signals transmission count of a next MAC PDU in each MAC PDU. The transmission count of the next MAC PDU can be signaled using a method of differentiating a CRC of MAC PDU, a method of performing transmission using D2D CI piggyback scheme, or a method that a partial field of an information bit includes a field for indicating the transmission count of the next MAC PDU.

As a fourth example, it may be able to use a method that transmission count of a first MAC PDU is determined by a resource pool-specific value via a network or a predetermined value and transmission count of a next MAC PDU is signaled by a previous MAC PDU. In this case, the transmission count of the next MAC PDU can be signaled by the previous MAC PDU via physical layer signaling or higher layer signaling. As an embodiment of the physical layer signaling, it may be able to use D2D CI piggyback scheme. Or, a field for indicating the transmission count of the next MAC PDU can be included in a partial information bit of a previously transmitted Packet.

As a fifth example, it may be able to differently configure a CRC mask of MAC PDU according to an NDI. For example, when the NDI corresponds to 0, if the CRC mask corresponds to X0, the CRC mask can be configured by X1 when the NDI corresponds to 1.

Meanwhile, when transmission count of MAC PDU is not 4, if the transmission count per MAC PDU is changed, legacy D2D UEs may fail to decode the MAC PDU. In order to enable the legacy D2D UEs to perform decoding, the transmission count per MAC PDU should be a multiple of 4. In particular, 4, 8, 12, 16, etc. can be used as the transmission count per MAC PDU. If interference is extremely severe or it is necessary to consistently transmit important information, the transmission count per MAC PDU may become equal to or greater than 4. In this case, an advanced UE (UEs appearing after LTE Rel. 12) can enhance reception capability by jointly decoding all received Packets. In the following, a method of changing transmission count per MAC PDU with a multiple of 4 is proposed to indicate the transmission count per MAC PDU corresponding to a multiple of 4 via PSCCH. To this end, it may be able to use the aforementioned indication method indicated via PSCCH. In particular, it may use a method of indicating the transmission count per MAC PDU using an unused field of MCS. If the transmission count per MAC PDU exceeds 4, since an effective coding rate becomes lowered as much as a rate not supported by a legacy MCS table, the method of indicating the transmission count per MAC PDU using the MCS field can be effective.

As a further different method, the transmission count per MAC PDU 4 or 8 (or 12, 16) can be determined according to an OCC or DMRS CS. As a further different method, as mentioned earlier in the third example of the method of indicating the transmission count by the MAC PDU itself, transmission count per current or next MAC PDU can be signaled using the piggyback scheme.

Meanwhile, if transmission count per MAC PDU is configured by a multiple of 4, a separate indication/signaling is not necessary. For example, if the transmission count per MAC PDU is set to 8, a legacy UE always attempts to perform decoding on the basis of 4 Packets and an advanced UE may attempt to perform decoding using all Packets. In this case, the legacy UE separately decodes 4 Packets and uploads a result of the decoding to upper layer. If MAC layer determines that two PDUs are not appropriate, there is a possibility that a wrong higher layer Packet connection is established. In order to prevent this, if the transmission count per MAC PDU exceeding 4 is configured, it may be able to differently configure all or a part of DMRS sequence/scrambling sequence/CRC/RE mapping for a Packet exceeding 4 times to prevent the legacy UE from receiving the Packet. For example, a case capable of receiving a DMRS base sequence, CS/OCC and a case incapable of receiving a DMRS base sequence, CS/OCC are differently configured. Or, when a scrambling sequence is generated, a case capable of receiving an initialization ID and a case incapable of receiving the initialization ID are differently configured. By doing so, it may be able to configure the advanced UE to receive an additional Packet only.

In the foregoing description, an RV (redundancy version) can be transmitted in a predetermined order. For example, if the transmission count corresponds to 3, the RV is transmitted in an order of 0→2→3. If the transmission count corresponds to 2, the RV is transmitted in an order of 0→2. The RV order according to the transmission count can be determined in advance or can be indicated by a network via physical layer signaling or higher layer signaling. An RV of MAC PDU can be indicated in a form of piggybacking UCI to each MAC PDU.

Method of Receiving Dynamic MAC PDU in D2D Communication

In the following, a case of indicating MAC PDU transmission count by an NDI 1 is explained among the aforementioned methods of indicating MAC PDU transmission count.

Figure 11:
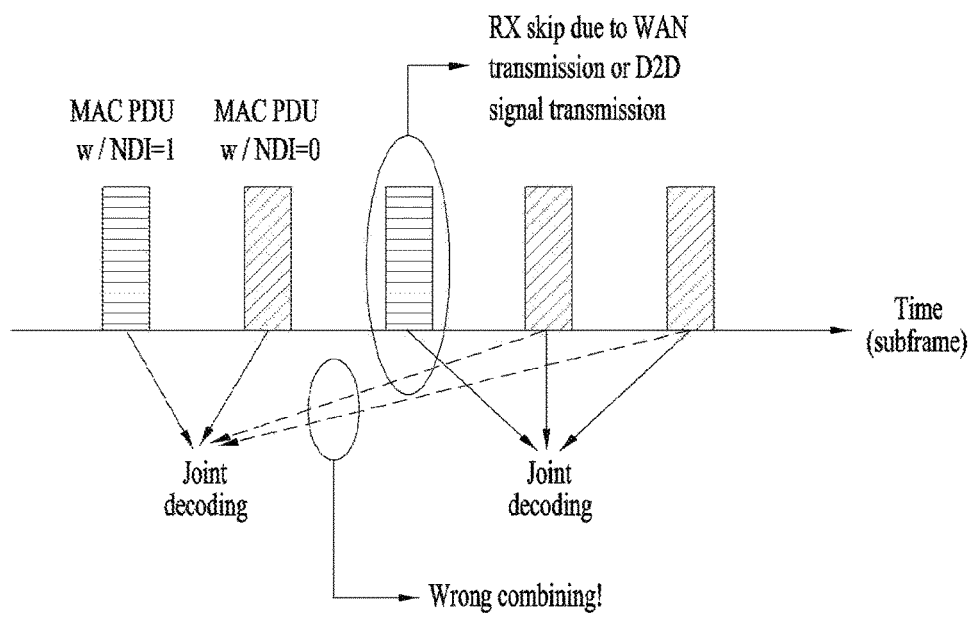

If the MAC PDU transmission count is indicated by the NDI only, a problem may occur due the characteristic of D2D communication. Referring to FIG. 11, MAC PDU with NDI=1, MAC PDU with NDI=2, MAC PDU with NDI=1, MAC PDU with NDI=2, and MAC PDU with NDI=2 are sequentially transmitted. In this case, the first and the second MAC PDU can be combined and the third, the fourth, and the fifth MAC PDU can be combined. If a UE fails to receive the third Packet in performing cellular PUSCH transmission, since NDI is not toggled, the UE performs joint decoding on the third and the fourth MAC PDU.

Figure 12:
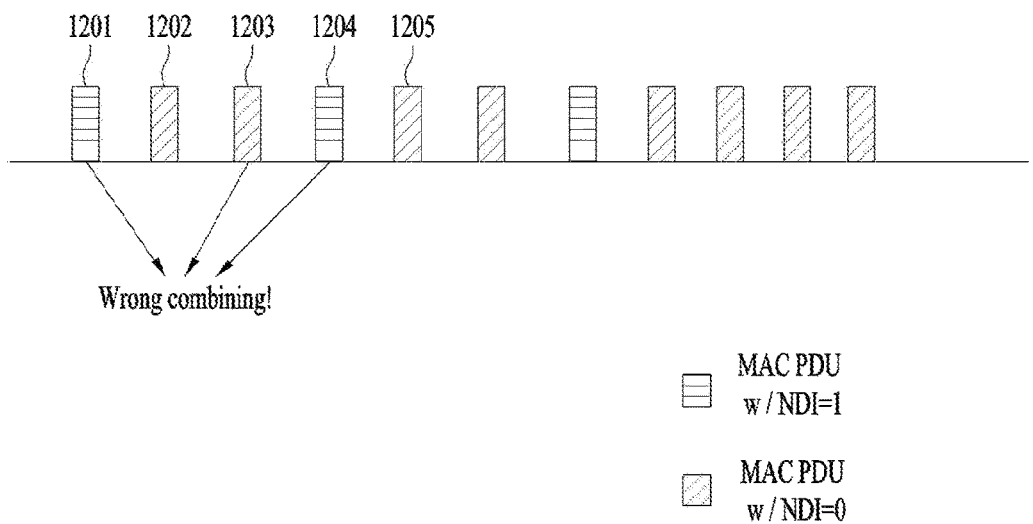

In case of performing a scheme of notifying MAC PDU transmission count only, a similar problem may occur. Referring to FIG. 12, assume that MAC PDU transmission count is changed to 3, 3, and 4 and a UE fails to receive a second Packet due to cellular PUSCH transmission. The UE recognizes MAC PDU transmission count as 3 after a first Packet is received, recognizes MAC PDU transmission count as 3 after a third Packet is received, and performs decoding by combining the first Packet and the third Packet with each other. Having received a fourth Packet corresponding to a new MAC PDU, since the indicated MAC PDU transmission count corresponds to 3, the UE performs decoding by combining the fourth Packet and the previously received Packet.

The abovementioned problem can be solved by using the method of indicating MAC PDU transmission count and the method of indicating MAC PDU transmission count via NDI at the same time. Specifically, a UE can receive a first MAC PDU and a second MAC PDU. In this case, the UE can determine whether to perform joint decoding on the first MAC PDU and the second MAC PDU. In this case, whether to perform the joint decoding can be determined based on the MAC PDU transmission count indicated to the UE and the NDI.

When the NDI of the first MAC PDU corresponds to 1, the NDI of the second MAC PDU corresponds to 0, and the MAC PDU transmission count is equal to or greater than the total number of MAC PDUs, which are received until the second MAC PDU is received after an MAC PDU with NDI=1 is received, if the MAC PDU transmission count is greater than 2, the UE can perform decoding in a manner of combining the first MAC PDU and the second MAC PDU.

For example, referring to FIG. 12, when MAC PDU transmission count (i.e., 3) is signaled to a UE, if the UE receives a first MAC PDU 1201 with NDI=1 and a second MAC PDU 1202 with NDI=0, since the signaled MAC PDU transmission count (i.e., 3) is equal to or greater than the total number of MAC PDUs (i.e., 1) which are received until the second MAC PDU 1202 is received after the first MAC PDU 1201 is received, the UE performs decoding in a manner of combining the first MAC PDU and the second MAC PDU. When the UE receives the second MAC PDU 1202 and the third MAC PDU 1203, it may have the same result. If both the NDI of the first MAC PDU and the NDI of the second MAC PDU correspond to 0 and the MAC PDU transmission count is greater than the total number of MAC PDUs which are received until the second MAC PDU is received after the first MAC PDU with NDI=1 is received, the UE can perform decoding in a manner of combining the first MAC PDU and the second MAC PDU. For example, referring to FIG. 12, when MAC PDU transmission count (i.e., 3) is signaled to a UE, if the UE receives a second MAC PDU 1202 and a third MAC PDU 1203, since the signaled MAC PDU transmission count (i.e., 3) is greater than the total number of MAC PDUs (i.e., 2) which are received until the third MAC PDU (NDI=0) 1203 is received after the first MAC PDU (NDI=1) 1201 is received, the UE performs decoding in a manner of combining the first MAC PDU 1201 and the third MAC PDU 1203. If the UE fails to receive a fourth MAC PDU 1202 and receives a fifth MAC PDU 1205, the UE does not combine the first MAC PDU 1201 and the fifth MAC PDU 1205 to perform decoding. This is because the signaled MAC PDU transmission count (i.e., 3) is not greater than the total number of MAC PDUs (i.e., 3) which are received until the fourth MAC PDU (NDI=0) 1205 is received after the first MAC PDU (NDI=1) 1201 is received.

If the NDI of the first MAC PDU corresponds to 0 and the NDI of the second MAC PDU corresponds to 1, the UE does not combine the two Packets to perform decoding.

In the foregoing description, it may be able to use the method mentioned earlier in the method of dynamically indicating MAC PDU transmission count in D2D communication for the NDI and the MAC PDU transmission count. For example, the MAC PDU transmission count may indicate multiplexing with MAC PDU in an RB (resource block) in which the MAC PDU is transmitted.

Or, if the first MAC PDU corresponds to a MAC PDU with first NDI=1 in a PSCCH transmission period, the MAC PDU transmission count can be indicated in PSSCH. If the first MAC PDU corresponds to a MAC PDU with second or later NDI=1 in the PSCCH transmission period, the MAC PDU transmission count can be indicated by MAC PDU appearing prior to the first MAC PDU.

Or, if the first MAC PDU corresponds to a MAC PDU with first NDI=1 in a PSCCH transmission period, the MAC PDU transmission count may correspond to a value allocated to a resource pool in advance. If the first MAC PDU corresponds to a MAC PDU with second or later NDI=1 in the PSCCH transmission period, the MAC PDU transmission count can be indicated by MAC PDU appearing prior to the first MAC PDU.

Method of Transmitting/Receiving Discovery Signal

In the following, a method of transmitting and receiving a discovery signal (DS) according to embodiment of the present invention is explained. In the following description, I-UE (in network coverage UE) corresponds to a UE capable of receiving a signal from an eNB within network coverage and the UE capable of performing a specific operation via an indication of the eNB, when strength of a signal received from the eNB is stronger than a prescribed threshold. And, O-UE (out-of-coverage UE) corresponds to a UE incapable of properly decoding a signal received from the eNB, when strength of the signal received from the eNB is equal to or weaker than a prescribed threshold.

In the partial network coverage, it is necessary for O-UEs to distinctively receive a DS of I-UE. Or, on the contrary, it is necessary for the O-UEs to determine a discovery signal of the I-UE. This can be effectively used in a UE-network relay operation. For example, when the I-UE detects a DS of the O-UE, the I-UE can play a role of a relay relaying the signal of the O-UE to an eNB. Meanwhile, according to legacy LTE Rel. 12, when the I-UE transmits a DS, the I-UE does not transmit PD2DSCH (or PSBCH). This is because a DS is not supported for the O-UE and a UE participating in D2D communication transmits a D2D signal only for the O-UE in LTE Rel. 12. Yet, it is expected that DS transmission for the O-UE is to be permitted in LTE Rel. 13. Hence, it is necessary for a UE transmitting a DS to transmit PSBCH together with an SSS. Since the PSBCH can be used as synchronization measurement for determining whether or not the O-UE becomes a synchronization source, the PDSCH corresponds to a channel to be mandatorily transmitted to the O-UE. Yet, if the I-UE transmits a DS only, since the I-UE does not transmit the PSBCH, it is difficult to properly perform the synchronization measurement. In the following, a method of transmitting PSBCH is proposed in the embodiment of the present invention, when the I-UE transmits a DS for the O-UE.

As a first method, an eNB can indicate a UE transmitting PSBCH among UEs transmitting a DS via physical layer signaling or higher layer signaling. According to the present method, it may be able to configure a UE indicated by the eNB only to transmit PSBCH while transmitting a DS. By doing so, it may be able to prevent all DS transmitting UEs from transmitting PSBCH for the O-UE. For example, the eNB can selectively indicate a relay capable UE or a D2D communication capable UE (or all relay capable UEs or D2D communication capable UEs in a cell) to transmit PSBCH among UEs transmitting a DS. If all DS transmitting UEs transmit the PSBCH, a UE incapable of performing a relay operation transmits the PSBCH as well. As a result, the O-UE performs synchronization measurement of a wrong UE and determines whether or not the wrong UE becomes a synchronization source, thereby having an undesirable result. In order to prevent the undesirable result, the eNB can indicate whether to transmit the PSBCH in consideration of UE capability or indicate a minority of UEs to transmit the PSBCH only among the DS transmitting UEs.

As a second method, a relay capable UE or a D2D communication capable UE can transmit the PSBCH only among DS transmitting UEs. In this case, a difference between the first method and the second method is in that a relay capable UE or a D2D communication capable UE (always) transmits the PSBCH together with an SSS. In this case, whether to transmit the PSBCH can be determined by the implementation of a UE. Or, it may be able to determine a rule that the PSBCH is always transmitted when a DS is transmitted. For example, if a specific UE corresponds to a relay capable UE and has many WAN signals to be transmitted, the specific UE may not transmit the PSBCH in order not to operate as a relay. In other word, when a UE does not transmit a relay signal while transmitting a DS, the UE can autonomously determine whether to transmit the PSBCH. Or, it may be able to determine a rule that the PSBCH is transmitted together with a D2DDSS only when a relay/ communication capable UE transmits an actual relay/communication Packet. In this case, relay capability can be distinguished from D2D communication capability. To this end, a relay capable UE can use a separate sidelink synchronization signal ID determined in advance. When only the relay capable UE transmits a DS, if the UE is configured to transmit an SS and the PSBCH together with the DS, it may be able to prevent the O-UE from measuring a DMRS of PSBCH of a DS only capable UE. By doing so, it may be able to prevent wrong synchronization measurement from being performed.

As a third method, when a network configures a D2D communication resource pool and a discovery resource pool, a period of the discovery resource pool can be always configured to be greater than a period of the D2D communication resource pool (more than a prescribed level). For example, it may be able to determine a rule that the period of the DS resource pool is configured to be greater than the period of the communication resource pool as much as X times. According to the present method, when the period of the discovery resource pool is identical to the period of the communication resource pool, it may be able to configure the period of the DS pool to be always greater than the period of the communication resource pool to reduce sidelink synchronization fluctuation. By doing so, although DS UEs transmit the PSBCH, it may be able to make measurement fluctuation intermittently occurs. In this case, the DS transmission UEs may or may not transmit the PSBCH. If a DS transmission UE transmits the PSBCH to a UE, it is necessary for the UE to determine whether the PSBCH is used for a usage of a DS or a usage of communication. In this case, if there is an assumption that the communication period is always configured to be shorter than the DS period, it may be able to prevent many DS UEs from transmitting the PSBCH via an upper layer measurement filter. By doing so, it may be able to prevent synchronization measurement from being fluctuated.

As a fourth method, when D2D communication UEs measure a D2D synchronization signal in a manner that a network signals period information of a DS resource pool to the D2D communication UEs via physical layer signaling or higher layer signaling, a filter coefficient is helpful for filtering measurement fluctuation due to the transmission of the PSBCH transmitted by the DS UEs. The period information of the DS pool can be transmitted in a manner of being included in the PSBCH of the communication UE and/or the PSBCH of the DS UE. As a variation of the present method, the network can signal a ratio between the D2D communication pool (e.g., SA resource pool) period and the discovery resource pool period or information corresponding to the ratio to the D2D communication UE via physical layer signaling or higher layer signaling. The ratio information of the periods can be transmitted in a manner of being included in the PSBCH of the communication UE and/or the PSBCH of the DS UE.

Configurations of Devices for Embodiments of the Present Invention

Figure 13:
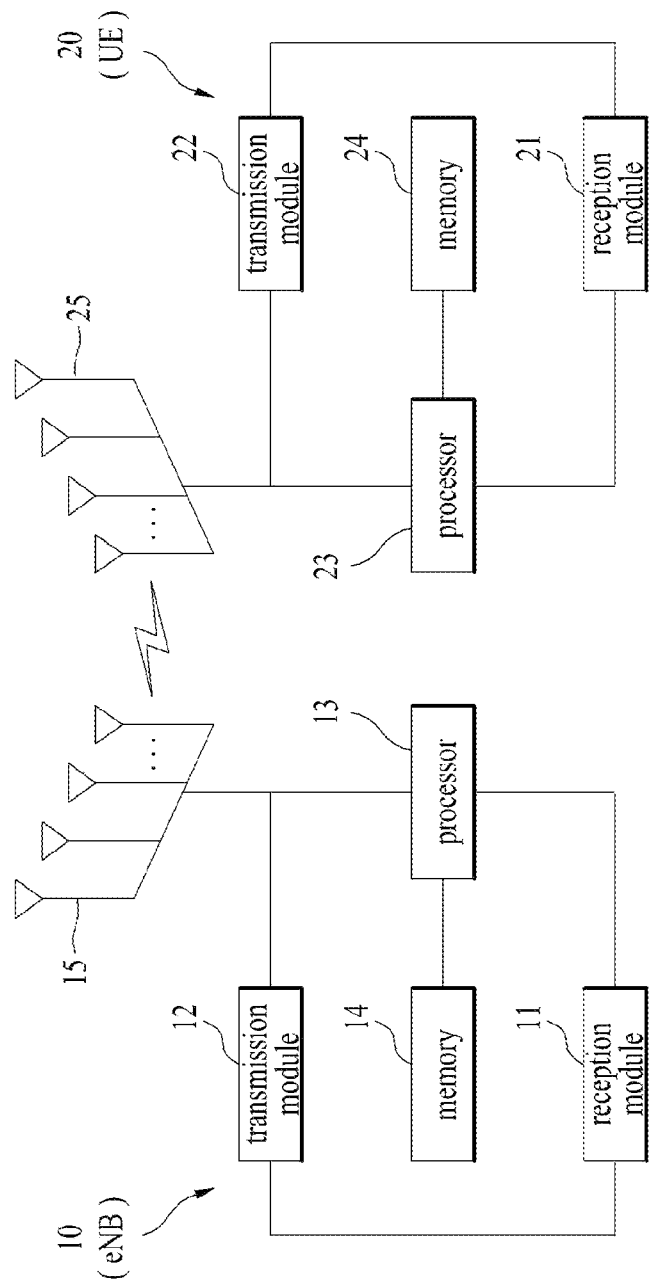
FIG. 13 is a diagram for configurations of a transmitter and a receiver.

FIG. 13 is a diagram illustrating configuration of a transmit point apparatus and a UE according to one embodiment of the present invention.

Referring to FIG. 13, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 13, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 13 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention can be applied to various mobile communication systems.

What is claimed is:

1. A method of receiving a device-to-device (D2D) signal, which is received by a user equipment (UE) in a wireless communication system, comprising the steps of:
   receiving a first medium access control protocol data unit (MAC PDU);
   receiving a second MAC PDU; and
   decoding by combining the first MAC PDU and the second MAC PDU when the second MAC PDU is a retransmission of the first MAC PDU,
   wherein a first total number of repetition transmissions configured for the first MAC PDU is obtained based on a Cyclic Redundancy Check (CRC) mask of the first MAC PDU;
   determining by the UE whether the second MAC PDU is the retransmission of the first MAC PDU based on the first total number of repetition transmissions and a New Data Indicator (NDI), and
   when the CRC mask of the first MAC PDU is different from a CRC mask of the second MAC PDU, the second MAC PDU is configured to a second total number of repetition transmissions that is different from the first total number of repetition transmissions.

2. The method of claim 1, wherein when the NDI of the first MAC PDU corresponds to 1, the NDI of the second MAC PDU corresponds to 0, and the first total number of repetition transmissions is equal to or greater than a total number of MAC PDUs, which are received until the second MAC PDU is received after an MAC PDU with NDI=1 is received, the UE performs decoding by combining the first MAC PDU and the second MAC PDU.

3. The method of claim 1, wherein if both the NDI of the first MAC PDU and the NDI of the second MAC PDU correspond to 0 and the first total number of repetition transmissions is greater than a total number of MAC PDUs, which are received until the second MAC PDU is received after an MAC PDU with NDI=1 is received, the UE performs decoding by combining the first MAC PDU and the second MAC PDU.

4. The method of claim 1, wherein if the NDI of the first MAC PDU corresponds to 0 and the NDI of the second MAC PDU corresponds to 1, the UE does not combine the first MAC PDU and the second MAC PDU when decoding is performed.

5. The method of claim 1, wherein the NDI has a different value according to an orthogonal cover code (OCC).

6. The method of claim 1, wherein the first total number of repetition transmissions corresponds to a multiple of 4.

7. A device-to-device (D2D) user equipment (UE) in a wireless communication system, comprising:
   a transmitter and a receiver; and
   a processor,
   the processor configured to:
   receive a first medium access control protocol data unit (MAC PDU) and a second MAC PDU,
   decode by combining the first MAC PDU and the second MAC PDU when the second MAC PDU is the retransmission of the first MAC PDU,
   wherein a first total number of repetition transmissions configured for the first MAC PDU is obtained based on a Cyclic Redundancy Check (CRC) mask of the first MAC PDU,
   wherein the processor determines whether the second MAC PDU is a retransmission of the first MAC PDU based on the first total number of repetition transmissions and a New Data Indicator (NDI), and
   when the CRC mask of the first MAC PDU is different from a CRC mask of the second MAC PDU, the second MAC PDU is configured to a second total number of repetition transmissions that is different from the first total number of repetition transmissions.

8. The D2D UE of claim 7, wherein when the NDI of the first MAC PDU corresponds to 1, the NDI of the second MAC PDU corresponds to 0, and the first total number of repetition transmissions is equal to or greater than a total number of MAC PDUs, which are received until the second MAC PDU is received after an MAC PDU with NDI=1 is received, if the MAC PDU transmission count is greater than 2, the D2D UE performs decoding by combining the first MAC PDU and the second MAC PDU.

9. The D2D UE of claim 7, wherein if both the NDI of the first MAC PDU and the NDI of the second MAC PDU correspond to 0 and the first total number of repetition transmissions is greater than a total number of MAC PDUs, which are received until the second MAC PDU is received after an MAC PDU with NDI=1 is received, the D2D UE performs decoding by combining the first MAC PDU and the second MAC PDU.

* * * * *